(12) United States Patent
Kim et al.

(10) Patent No.: US 12,730,774 B2
(45) Date of Patent: Sep. 8, 2026

(54) ADAPTIVE RETIMER WITH BYPASS

(71) Applicant: Credo Technology Group Limited, George Town (KY)

(72) Inventors: Kyungjin Kim, San Jose, CA (US); Alex Nazari, San Francisco, CA (US); Arshan Aga, Mountain View, CA (US); Yu Fen Lin, San Francisco, CA (US)

(73) Assignee: Credo Technology Group Limited (KY)

( * ) Notice: Subject to any disclaimer, the term of this patent is extended or adjusted under 35 U.S.C. 154(b) by 0 days.

(21) Appl. No.: 18/950,594

(22) Filed: Nov. 18, 2024

(65) Prior Publication Data

US 2026/0140916 A1 May 21, 2026

(51) Int. Cl.
*G06F 13/42* (2006.01)
*G06F 11/22* (2006.01)

(52) U.S. Cl.
CPC ........ *G06F 13/4291* (2013.01); *G06F 11/221* (2013.01); *G06F 2213/0026* (2013.01)

(58) Field of Classification Search
None
See application file for complete search history.

(56) References Cited

U.S. PATENT DOCUMENTS

2025/0385452 A1* 12/2025 Blackburn ............ H01R 12/75

* cited by examiner

*Primary Examiner* — Scott C Sun
(74) *Attorney, Agent, or Firm* — Daniel J. Krueger; Ramey LLP

(57) ABSTRACT

Various adaptive retiming methods and apparatuses. One illustrative retimer apparatus takes the form of an integrated circuit having: at least one input contact configured to receive an input PCIe signal; a retimer module configured to convert the input PCIe signal into a digital symbol stream, and further configured to convert the digital symbol stream into a retimed PCIe signal; a multiplexer having a first selectable input configured to receive the retimed PCIe signal; a bypass path configured to provide an analog PCIe signal to a second selectable input of the multiplexer; and at least one output contact coupled to an output of the multiplexer to provide an output PCIe signal.

20 Claims, 5 Drawing Sheets

102
MEMORY
106
104
CPU
x4
x4
x4
x8
x8
x8
x16
x16
108
121
RETIMER
122
RETIMER
123
RETIMER
140
CEM
CEM
CEM
CEM
CEM
CEM
CEM
110
CEM
130
151
RETIMER
150
CEM
120
142

200
LANE 0
LN IN
206
204
202
LN OUT
CR
DES.
SERIALIZER
CTLE
ADC
FFE
DFE
S2P
CORE
P2S
PRE
DAC
LVL
CNTL
LN OUT
212
214
216
LN IN
SERIALIZER
CR
DES.
DAC
PRE
P2S
CORE
S2P
DFE
FFE
ADC
CTLE
CNTL
LVL
LANE 1
...
LANE N-1
UP CHANNEL
DN CHANNEL
PWR & CLK
MEMORY
I/O CELLS
JTAG

Initial State
Detect
300
Polling
302
Configuration
303
L0
L0p
306
L0s
307
L2
309
L1
308
Disabled
304
Hot Reset
301
Loopback
305
Recovery
320
L0LL
330

Fig. 5

| PCIe RATE | SYMBOL RATE | SYMBOL TYPE | THRESHOLD |
|---|---|---|---|
| GEN 1 | 2.5 GHz/lane | NRZ | A |
| GEN 2 | 5.0 GHz/lane | NRZ | B |
| GEN 3 | 8.0 GHz/lane | NRZ | C |
| GEN 4 | 16.0 GHz/lane | NRZ | D |
| GEN 5 | 32.0 GHz/lane | NRZ | E |
| GEN 6 | 32.0 GHz/lane | PAM4 | F |
| GEN 7* | 64.0 GHz/lane | PAM4 | G |

ADAPTIVE RETIMER WITH BYPASS

TECHNICAL FIELD

The present disclosure pertains to the field of data communication systems, specifically focusing on adaptive retimer technologies for PCIe systems. The technology involves mechanisms for reducing latency by selectively bypassing the retimer's signal processing under conditions that maintain adequate signal integrity at different supported data rates.

BACKGROUND

The Peripheral Component Interconnect Express ("PCIe") Specification is one of a variety of standards for general purpose input/output interconnects. Such interconnects are frequently used for expansion buses that can accept expansion cards or other interchangeable components for augmenting the resources and capabilities of computers and other electronic systems. The PCI Special Interest Group is an industry consortium that regularly updates the PCIe Specification every few years to double the data rate while maintaining backward compatibility inasmuch as possible. The supported data rates make PCIe attractive for systems designed to implement machine learning, artificial intelligence, real time image processing, gaming, high bandwidth data storage, and even computer center networking.

With its origins as a parallel bus, PCIe imposes strict limitations on latency to facilitate the use of a load-store interconnect protocol. This latency limitation necessarily limits the reach of a given PCIe link particularly at high symbol rates where noise or other signal integrity issues may necessitate relatively frequent retransmissions. Retimers may combat such signal integrity issues and (despite increasing the minimum latency) may improve consistency and substantially reduce the average transaction latency.

The most recent versions of the specification raise the data rate in part by altering the signalling scheme to employ 4-level pulse amplitude modulation (PAM4) channel symbols rather than non-return to zero (NRZ) channel symbols. This change reduces the signal margin, often necessitating the use of a retimer to assure that the bit error rate is maintained at a sufficiently low level. Notably, however, the signal integrity may not be known during the system's design phase, in part because the PCIe Specification provides backward compatibility for lower data rates when communicating with devices from previous generations of the specification. In such situations, the utility of a retimer cannot be ascertained ahead of time and its usage may be a potential determinant to system performance.

SUMMARY

Accordingly, there are disclosed herein various adaptive retiming methods and apparatus. One illustrative retimer apparatus takes the form of an integrated circuit having: at least one input contact configured to receive an input PCIe signal; a retimer module configured to convert the input PCIe signal into a digital symbol stream, and further configured to convert the digital symbol stream into a retimed PCIe signal; a multiplexer having a first selectable input configured to receive the retimed PCIe signal; a bypass path configured to provide an analog PCIe signal to a second selectable input of the multiplexer; and at least one output contact coupled to an output of the multiplexer to provide an output PCIe signal.

An illustrative retiming method includes: receiving an input PCIe signal with at least one input contact; using a multiplexer to select between an analog PCIe signal from a bypass path and a retimed PCIe signal from a retimer configured to convert the input PCIe signal into a digital symbol stream, and further configured to convert the digital symbol stream into a retimed PCIe signal; and coupling an output of the multiplexer to at least one output contact to provide an output PCIe signal.

An illustrative system includes: a processor module having a PCIe root complex interface; a peripheral having a PCIe end point interface; and a retimer that couples the PCIe root complex interface to the PCIe end point interface. The retimer provides multiple lanes, each lane including: a pair of upstream input contacts configured to receive an upstream input PCIe signal; an upstream deserializer configured to convert the upstream input PCIe signal into an upstream digital symbol stream; an upstream serializer configured to convert the upstream digital symbol stream into an upstream retimed PCIe signal; an upstream multiplexer having a first selectable input configured to receive the upstream retimed PCIe signal; an upstream bypass path configured to provide an upstream analog PCIe signal to a second selectable input of the upstream multiplexer; and a pair of upstream output contacts coupled to an output of the upstream multiplexer to provide an upstream output PCIe signal.

Each of the foregoing may be implemented individually or conjointly, together with any one or more of the following features in any suitable combination: 1. a monitor module configured to determine a PCIe signal integrity measurement. 2. the PCIe signal integrity measurement includes a signal to noise ratio. 3. the PCIe signal integrity measurement includes an eye height. 4. the retimer is configured to determine a data rate indicator of the PCIe signal. 5. control logic configured to control the multiplexer based at least in part on the PCIe signal integrity measurement. 6. control logic configured to control the multiplexer based at least in part on the data rate indicator. 7. the control logic is configured to select the analog PCIe signal if the PCIe signal integrity measurement exceeds a threshold, the threshold depending on the data rate indicator. 8. the PCIe signal integrity measurement is for at least one of: the input PCIe signal, the analog PCIe signal, and the output PCIe signal. 9. the at least one input contact includes a pair of input contacts and the input PCIe signal is a differential signal. 10. the at least one output contact includes a pair of output contacts and the output PCIe signal is a differential signal. 11. a driver converts the output of the multiplexer into the output PCIe signal. 12. the data rate indicator includes at least one of: a highest common rate determined based on a data rate identifier extracted from the digital symbol stream, and a symbol rate measured by the retimer. 13. using a continuous time filter to convert the input PCIe signal into the analog PCIe signal. 14. each lane further includes: a pair of downstream input contacts configured to receive a downstream input PCIe signal; a downstream deserializer configured to convert the downstream input PCIe signal into a downstream digital symbol stream; a downstream serializer configured to convert the downstream digital symbol stream into a downstream retimed PCIe signal; a downstream multiplexer having a first selectable input configured to receive the downstream retimed PCIe signal; a downstream bypass path configured to provide a downstream analog PCIe signal to a second selectable input of the downstream multiplexer; and a pair of downstream output contacts coupled to an output of the downstream multiplexer to provide a downstream output PCIe signal.

BRIEF DESCRIPTION OF THE DRAWINGS

FIG. 5 is a table illustrating data rates and thresholds for various PCIe generations.

DETAILED DESCRIPTION

Figure 1:
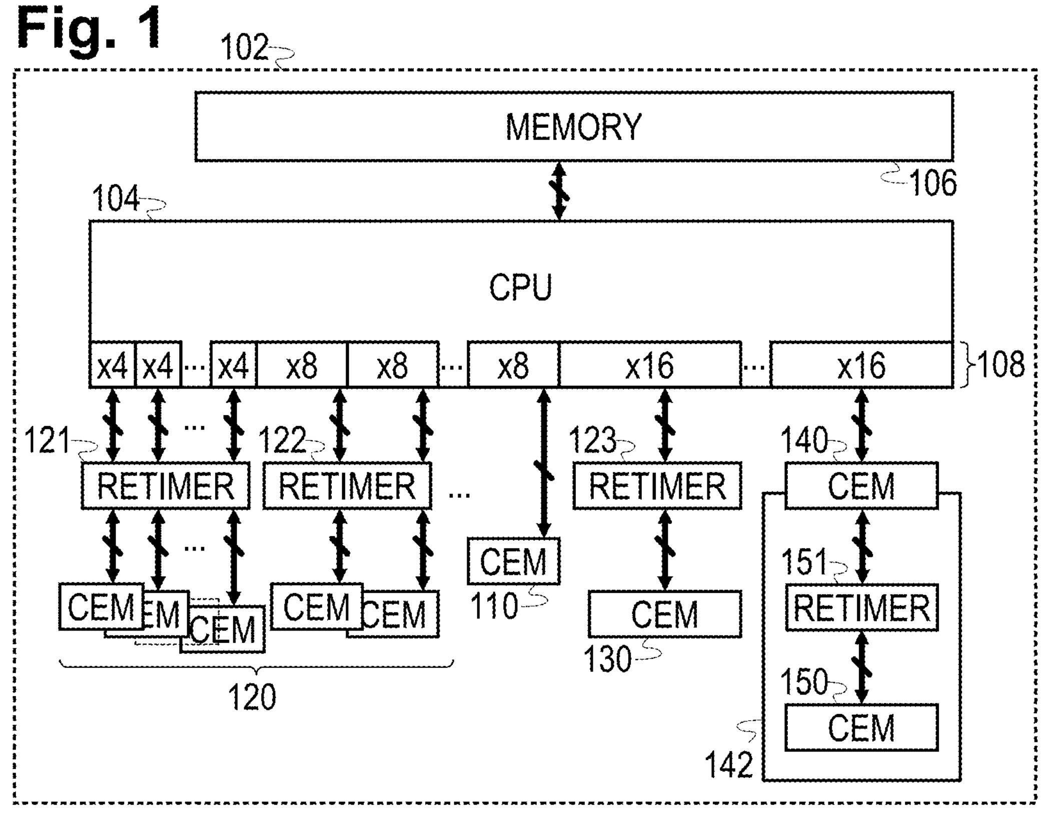
FIG. 1 is a block diagram of an illustrative computer system using PCIe bus interfaces to interconnect a processor module with multiple peripheral slots.

Note that the specific embodiments given in the drawings and following description do not limit the disclosure. On the contrary, they provide the foundation for one of ordinary skill to discern the alternative forms, equivalents, and modifications that are encompassed in the claim scope.

The disclosed adaptive retimers and methods are best understood in an illustrative context. Accordingly, FIG. 1 shows an illustrative computer system 102 having a processing module 104 (labeled as CPU), which interfaces with a system memory 106 to retrieve instructions and data for implementing programmable functions. The processing module 104 is shown with multiple PCIe bus interfaces 108 to connect with various other components via, e.g., connectors having a standard Card Electromagnetic (CEM) slot form factor. Other PCIe connector form factors are known and may be used.

FIG. 1 shows CEM slots 110, 120, 140, 150 that may support different numbers of lanes and different PCIe data rates as needed for different types of components. Components such as graphical processing units and video display cards may employ connectors using the highest data rates and number of lanes, whereas bridges to peripheral components, printers, keyboards, pointing devices, and general input/output buses may employ connectors using slower data rates and fewer lanes. Intermediate connectors may be employed for hard drives, solid state drives, network interfaces, cameras, scanners. Some slots, e.g., CEM slot 110, are shown without retimers. Some retimers, e.g., retimers 121, 122, may support communications to multiple CEM slots 120 that require fewer than the number of lanes a given retimer can support. Retimer 123 provides retiming of communications between the processing module and CEM slot 130. CEM slot 140 has no retimer but accepts a riser card 142. Riser card 142 has a retimer 151 that may provide retiming for communications with the riser card's CEM slot(s) 150.

Figure 2:
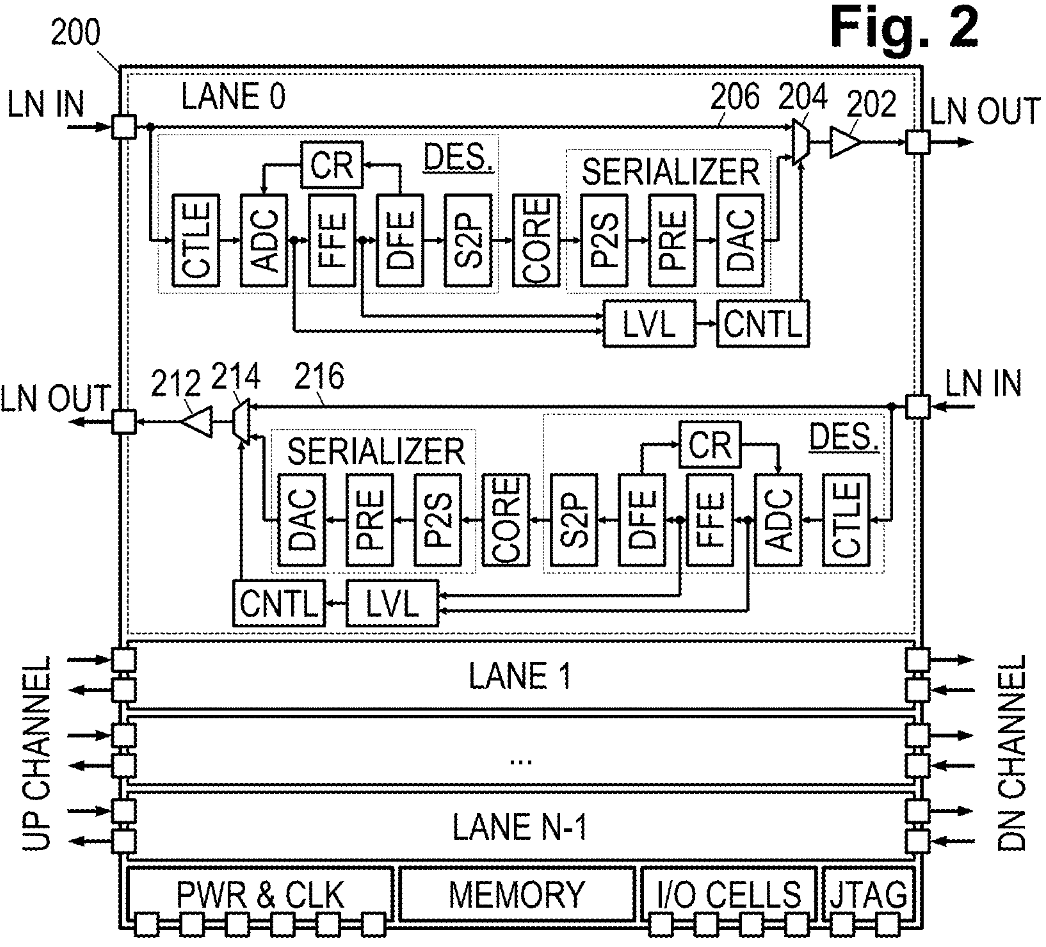
FIG. 2 is a schematic of an illustrative integrated circuit showing lanes with drivers, multiplexers, retimer modules, and bypass paths.
Figure 3:
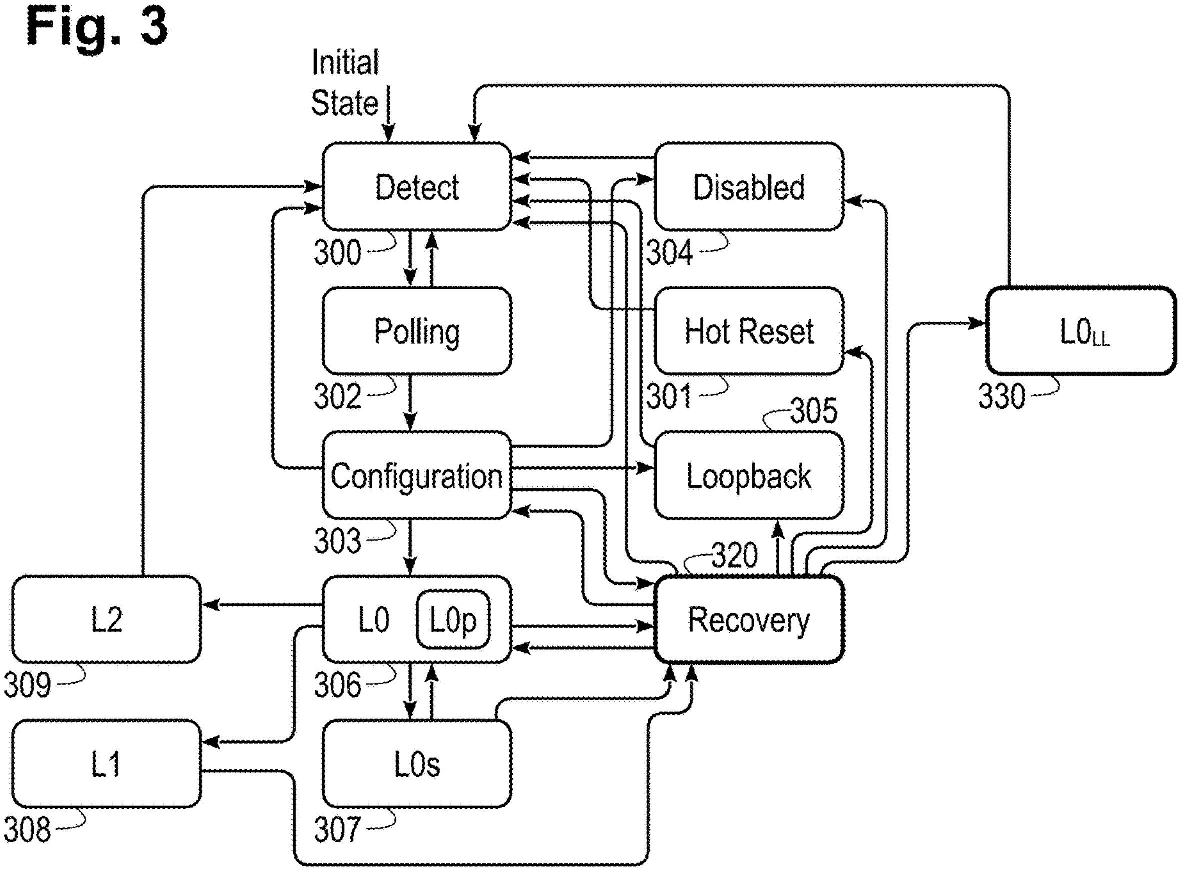
FIG. 3 is a state transition diagram of an illustrative link training state machine.

FIG. 2 shows an illustrative retimer in the form of a monolithic integrated circuit chip 200 having contacts for receiving off-chip signals and contacts for providing off-chip signals. Though the figure shows contacts for single-ended signals, in practice some of the input and output signals may be differential signals necessitating the use of a pair of contacts for each such signal. The contacts may be pads, pins, balls, bond wires, or any suitable conductive path from the integrated circuit substrate to the external surface traces.

Chip 200 includes multiple lanes Lane0 through Lane(N−1), each lane conveying an upstream PCIe signal from a downstream link to an upstream link and a downstream PCIe signal from an upstream link to a downstream link. Each lane includes a downstream retimer module having a deserializer (DES) that converts a downstream input PCIe signal into a downstream digital symbol stream, and a serializer that converts the downstream digital symbol stream into a retimed downstream PCIe signal. Each lane further includes an upstream retimer module having a deserializer that converts an upstream input PCIe signal into an upstream digital symbol stream, and a serializer that converts the upstream digital symbol stream into a retimed upstream PCIe signal. Core logic (CORE) buffers the digital symbol streams and optionally enables additional functions such as descrambling, deskew between lanes, ordered set (OS) decoding, link training state machine implementation, and scrambling.

Each lane further includes output drivers 202, 212 to provide the downstream and upstream PCIe output signals to the downstream and upstream links, respectively. The output drivers 202, 212, buffer the outputs of multiplexers 204, 214, respectively, and in some cases may convert single-ended on chip signals to differential signals for the output contacts. In other implementations, the analog on-chip signals are maintained as differential signals throughout.

At one of their selectable inputs, multiplexers 204, 214 receive a retimed PCIe signal from their respective retimer modules. At their other selectable input, each of the multiplexers 204, 214 receives an analog PCIe signal from a bypass path 206, 216 that bypasses at least the digital components of the retimer modules. In certain contemplated implementations, the bypass path 206 excludes all signal processing circuits to minimize signal latency. As shown in FIG. 2, for example, the second selectable input receives the input PCIe signal directly from the input contacts. While this direct bypass may usually be the most advantageous, certain alternative implementations may use analog filtering or amplification of the input PCIe signal to provide the analog PCIe signal to the second selectable input. In yet another alternative implementation, the multiplexers 204, 214, may provide their outputs directly to the output contacts and the output drivers 202, 212, if included, may be positioned at the multiplexer input to operate solely on the retimed PCIe signals.

FIG. 2 also shows additional implementation detail for the illustrative serializers and deserializers. The deserializers implement the receiving function of the retimer modules, implementing decision feedback equalization ("DFE") or any other suitable equalization technique including those that employ a discrete-time finite impulse response ("FIR") filter with adjustable tap coefficients, e.g., linear equalization, partial response equalization.

Each illustrative deserializer includes a continuous time linear equalizer (CTLE) to attenuate out-of-band noise and to optionally provide some spectral shaping to amplify high-frequency components of the receive signal. An analog to digital converter (ADC) is provided to digitize the input signal, and a digital filter (also known as a feed-forward equalizer or "FFE") performs further equalization to further shape the overall channel response of the system and minimize the effects of leading intersymbol interference on the current symbol. As part of the shaping of the overall channel response, the FFE may also be designed to shorten the channel response of the filtered signal while minimizing any attendant noise enhancement. A decision feedback equalizer (DFE) subtracts a feedback signal to reduce the effects of trailing intersymbol interference before making symbol decisions. A clock recovery (CR) module may convert the equalization error (a difference between the symbol decision and the input to the symbol decision element) to a sampling clock for the analog to digital converter. A serial to parallel (S2P) module converts the sequence of symbol decisions to a parallelized stream of digital symbols for buffering or processing at a lower clock rate.

Each illustrative serializer includes a parallel to serial (P2S) module that converts the parallelized stream of digital symbols to a sequence of channel symbols. An optional pre-equalizer (PRE) can be used to shape the signal spectrum to at least partly compensate for channel attenuation of the output signal. A digital to analog converter (DAC) uses a transmit clock to produce the retimed PCIe signal.

Each lane further includes a controller (CNTL) that controls the multiplexers 204, 214 and may serve other functions including coordination of the retimer modules components. For illustrative purposes, the figure shows separate controllers for the upstream and downstream directions, but in practice their functions may be performed by a shared controller.

FIG. 2 further shows an optional signal integrity monitor, such as a level finder (LVL), configured to receive the digitized upstream and downstream input PCIe signals and to provide associated signal integrity measurement to the controller. As described in co-owned U.S. Pat. No. 11,018,656 "Multi-function level finder for SerDes", which is hereby incorporated herein by reference, level finders can be applied to signals at various stages of the deserializer to provide measurements of signal to noise ratio, eye height, and other signal statistics that are indicative of signal integrity. The controller may control the multiplexers 204, 214 based on the signal integrity measurement by, e.g., comparing the measurement to a threshold. As discussed further below, the threshold may depend on the data rate of the input PCIe signals. The controller may alternatively control the multiplexers 204, 214, based solely on the data rate of the input PCIe signals. The data rate can be determined based on the deserializer's clock recovery module, or can be determined by the core logic based on ordered sets (OS) embedded in the input PCIe signals. For suitably low data rates, the controller may set the multiplexers to select the analog PCIe signals from the bypass paths, whereas for data rates exceeding 32 Gbps, the controller may set the multiplexers to select the retimed PCIe signals.

In addition to the multiple lanes, chip 200 may include additional support modules. A power and clock module (PWR & CLK) regulates and distributes power to the other components of chip 200 and generates a clock signal or derives it from a reference clock signal received via input contacts. A nonvolatile memory module may store firmware for use by the controller(s) to configure operation of the retimer modules, particularly where their operations are subject to configuration parameters that are initialized during a bootup or reset process. A digital I/O module (I/O Cells) may implement a management bus interface, enabling the operation of controllers (and thus the chip as a whole) to be monitored and modified. The digital I/O module may support one or more suitable management bus protocols such as I2C, MDIO, SPI, enabling an external host to read from and write to configuration registers in the memory module. The digital I/O module may further support input of an enable signal, and output of one or more of a fault, status, error, or interrupt signal. A JTAG module may be reserved for use by automated test equipment in accordance with the JTAG specification for built-in self-testing.

Using the core logic of each lane, the chip 200 may implement a link training state machine having states corresponding to the link training and status state machine (LTSSM) states shown and described in Section 4.2 of the PCI Express Base Specification Revision 6.1. The referenced specification is hereby incorporated herein by reference in its entirety. State 320 is modified and state 330 may be added. The chip may implement the state machine independently for the upstream link and for the downstream link.

State 300 is the state in which the chip initially starts and may return to in the event of a reset or link failure. The multiplexers 204, 214 for each lane are initially set to provide the retimed PCIe signals as output. State 300 represents a detection state used by the chip to detect when the upstream link and downstream link lanes are each terminated at the far end, i.e., each connected to port that can send signals to at least one lane of the chip's upstream interface and to at least one lane of the chip's downstream interface. Lack of such terminations may be apparent as a high impedance on the output signal conductors.

State 301 is a Hot Reset state which the chip enters if triggered to do so via the digital I/O module or if the OS decoders of the core logic indicate a hot reset command has been received. After a 2 ms timeout, the chip enters the Detect state 300.

State 302 is a Polling state which the chip enters from state 300 after determining which lanes are terminated. In the Polling state, the upstream and downstream interfaces transmit training ordered sets and respond to the training ordered sets they receive. The receivers achieve lock (clock synchronization) with the symbols and blocks conveyed by the uplink and downlink signals, adjusting lane polarity and adapting equalizer settings if needed. The interfaces exchange capability information to negotiate a data rate. If enough training ordered sets are exchanged before time out, the chip transitions to state 303. Otherwise, it returns to state 300.

State 303 is a configuration state that implements a negotiation sequence to determine the lane width of the link and the numbering of the lanes. If a link is disabled, e.g., due to an ordered set command, the chip transitions to state 304. If the controller or an ordered set command places the link into loopback mode, the chip transitions to state 305. If the negotiation sequence completes before time out, the chip transitions to state 306. Otherwise, the chip transitions to state 320.

State 304 is a Disabled state during which the interfaces maintain the link in an Electrical Idle mode. The chip transitions from this state to state 300 when an electrical idle exit command is detected.

State 305 is a loopback test mode which the controller may use to perform link testing. During the loopback test mode, the interface that initiates the loopback request is the lead, transmitting symbol patterns that will be echoed back by the remote end. When the chip exits this state, it returns to detect state 300.

State 306 is known as the L0 state which represents the state of normal operation for the link to transmit and receive data and control packets. The chip may exit the L0 state when an event occurs, or a command OS is detected. The L0 state may have a substate L0p in which some lanes of the link are placed into idle mode while the rest remain active. The L0p is intended as a first power savings state. The chip transitions from the L0 state to the Recovery state 320 when a transition is encountered, e.g., a request to use a different data rate or a determination to switch to a bypass mode.

State 307 is a power savings state L0s entered from state 306 when the chip detects an Electrical Idle ordered set. The lanes are maintained in the electrical idle condition until an electrical idle exit command is detected. The chip exchanges a fast-training sequence across the link to re-establish synchronization before returning to block 306. If the fast-training sequence does not complete successfully, the chip transitions to recovery state 320.

State 308 is a power savings state L1 that offers greater power savings at the cost of additional resume latency. It may be selected by the controller or by a command ordered set as an alternative to the L0s state. Upon exiting this state, the chip transitions to recovery state 320.

State 309 is a power savings state L2 in which most of the interface is powered down to aggressively conserve power. When power is restored or a wakeup event is otherwise detected, the chip transitions to detect state 300.

In recovery state 320, the chip confirms or re-establishes synchronization and may optionally update equalization settings and may renegotiate the data rate before optionally returning to state 306. The chip can also reach other states from here if prompted by the controller or a command OS. For example, the controller may initiate a transition to the loopback state 305, to the hot reset state 301, or to the disabled state 304.

Recovery state 320 may be augmented to facilitate transitions to a low latency state. If in state 306 the controller determines that the input PCIe signal integrity and/or the agreed data rate are such that retiming is unnecessary, the chip may transition to recovery state 320 before enabling the upstream and downstream bypass paths. In this mode, no data symbols will be in transition during the switch of the multiplexers from the retimed PCIe signal to the analog PCIe signal on entry to low-latency state $L0_{LL}$ 330.

State 330 is a normal operations mode $L0_{LL}$ for the low latency state with the bypass paths enabled. Clocks may be disabled for the retimer modules to reduce power consumption, though this makes the chip unable to monitor ordered sets. An exit from this state occurs via a reset of the chip 200 or a sideband communication e.g., via the management bus.

Figure 4:
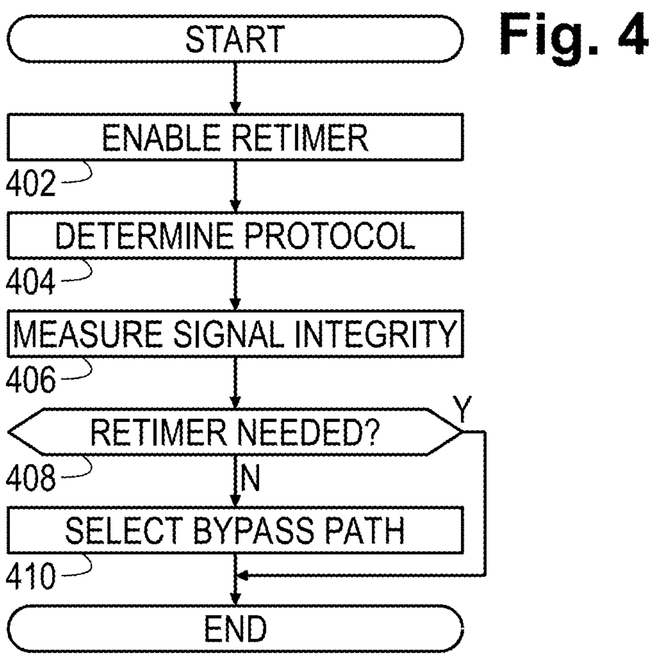
FIG. 4 is a flowchart of an illustrative retiming method utilized by the integrated circuit.

FIG. 4 is a flowchart on an illustrative retiming method that may be implemented by the disclosed integrated circuit chip, or more specifically, by application specific control logic or by programmable control logic executing firmware stored in nonvolatile memory. The method begins in block 402 with the chip enabling the retimer modules in each lane and setting the multiplexers to select the retimed PCIe signals. In block 404, the retimer modules in each lane determine the signaling protocol including the highest data rate supported by the PCIe end point and root complex components. Turning momentarily to FIG. 5, the PCIe standard supports six data rates to maintain backward compatibility across the various generations of the periodically updated PCIe standard. A seventh generation is currently under development and is expected to be released in 2025. Generations 6 and 7 support PAM4 channel symbols, whereas the previous generations employ NRZ signaling.

In block 406, the chip obtains a signal integrity measurement. In at least some implementations, the integrity measurement is made on a representative input PCIe signal, but this is not a requirement. The integrity measurement can be made on each of the input PCIe signals, on a filtered PCIe signal, on the signal input to the symbol decision element, or on the equalization error. The integrity measurement may be an eye height, an error margin, a noise variance, a signal-to-noise ratio, or any suitable indication of an error rate. Direct error rate measurements are also possible but may be slower and hence less desirable relative to other measurements.

In block 408, the chip automatically determines whether the retimer modules are providing a benefit to system performance. If the negotiated data rate and/or signal integrity measurement indicates that an expected error rate of communications between the chip's upstream node and the chip's downstream node falls below a given threshold of, say, $10^{-12}$, when the retimer modules are bypassed, the retimer modules are not providing a benefit to system performance. If the retimer modules are not needed, the chip configures the multiplexers to bypass the retimer modules in block 410. The chip may optionally disable the retimer modules to also reduce power consumption. Conversely, if the retimer modules are needed, the method leaves the multiplexers configured to select the retimed PCIe signals.

FIG. 5 indicates that the thresholds A-G used for the signal integrity measurements vary based on the Generation. For some signal integrity measurements, e.g., signal to noise ratio, this may not necessarily be the case. Regardless, the values for thresholds A-G can be readily determined experimentally or via simulation and incorporated into the design, e.g., as a look up table. We note here that for systems that meet design specifications, actual measurements of signal integrity may be unneeded, as the expected error rate may be highly correlated with the negotiated data rate. Some contemplated implementations accordingly make the bypass determination based solely on whether the negotiated data rate exceeds a given value. In some cases, this given value may correspond to the associated symbol type, with retiming being employed when PAM4 channel symbols are part of the protocol and the retimer modules bypassed when channel symbols are limited to NRZ, i.e., at 32 Gbps (Gen 5).

Retimers and other devices that employ serializer and deserializer modules have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("intellectual property (IP) core", "soft macro") but are frequently employed interchangeably.

The modular units can be expressed in different ways, e.g., in the form of a hardware description language (HDL) file, or as a fully routed design that could be directly printed to create a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description. In any case, such semiconductor IP cores may be kept in a design database which resides on a nontransient information storage medium, e.g., a hard disk, flash drive, or any of the known hardware implementations for cloud-based abstractions of nonvolatile information storage. Once the device has been fully designed, commercially available software may convert the semiconductor intellectual property cores and other integrated circuit components into semiconductor mask patterns also stored on a nontransient information storage medium. Thereafter, the patterns may be conveyed to the various process units in a suitable assembly line of an integrated circuit manufactory.

Numerous alternative forms, equivalents, and modifications will become apparent to those of ordinary skill in the art once the above disclosure is fully appreciated. It is intended that the claims be interpreted to embrace all such alternative forms, equivalents, and modifications where applicable.

What is claimed is:

1. An integrated circuit that comprises:
at least one input contact configured to receive an input PCIe signal;
a retimer configured to convert the input PCIe signal into a digital symbol stream, and further configured to convert the digital symbol stream into a retimed PCIe signal;
a multiplexer having a first selectable input configured to receive the retimed PCIe signal;
a bypass path configured to provide an analog PCIe signal to a second selectable input of the multiplexer; and
at least one output contact coupled to an output of the multiplexer to provide an output PCIe signal.

2. The integrated circuit of claim 1, further comprising:
a monitor configured to determine a PCIe signal integrity measurement; and
control logic configured to control the multiplexer based at least in part on the PCIe signal integrity measurement.

3. The integrated circuit of claim 2, wherein the PCIe signal integrity measurement includes a signal to noise ratio.

4. The integrated circuit of claim 2, wherein the PCIe signal integrity measurement includes an eye height.

5. The integrated circuit of claim 1, wherein the retimer is further configured to determine a data rate indicator of the PCIe signal, and wherein the integrated circuit further comprises:
control logic configured to control the multiplexer based at least in part on the data rate indicator.

6. The integrated circuit of claim 5, further comprising:
a monitor configured to determine a PCIe signal integrity measurement for at least one of: the input PCIe signal, the analog PCIe signal, and the output PCIe signal,
wherein the control logic is configured to select the analog PCIe signal if the PCIe signal integrity measurement exceeds a threshold, the threshold depending on the data rate indicator.

7. The integrated circuit of claim 1, wherein the at least one input contact includes a pair of input contacts, wherein the input PCIe signal is a differential signal, wherein the at least one output contact includes a pair of output contacts, wherein the output PCIe signal is a differential signal, and wherein a driver converts the output of the multiplexer into the output PCIe signal.

8. A method that comprises:
receiving an input PCIe signal with at least one input contact;
using a multiplexer to select between an analog PCIe signal from a bypass path and a retimed PCIe signal from a retimer configured to convert the input PCIe signal into a digital symbol stream, and further configured to convert the digital symbol stream into a retimed PCIe signal; and
coupling an output of the multiplexer to at least one output contact to provide an output PCIe signal.

9. The method of claim 8, further comprising:
determining a PCIe signal integrity measurement; and
controlling the multiplexer based at least in part on the PCIe signal integrity measurement.

10. The method of claim 9, wherein the PCIe signal integrity measurement includes at least one of: a signal to noise ratio, and an eye height.

11. The method of claim 8, further comprising:
determining a data rate indicator of the PCIe signal; and
controlling the multiplexer based at least in part on the data rate indicator.

12. The method of claim 11, wherein the data rate indicator includes at least one of: a highest common rate determined based on a data rate identifier extracted from the digital symbol stream, and a symbol rate measured by the retimer.

13. The method of claim 11, further comprising:
determining a PCIe signal integrity measurement,
wherein as part of controlling the multiplexer, the method includes selecting the analog PCIe signal if the PCIe signal integrity measurement exceeds a threshold, the threshold depending on the data rate indicator.

14. The method of claim 8, further comprising using a continuous time filter to convert the input PCIe signal into the analog PCIe signal.

15. The method of claim 8, further comprising using a driver to convert the output of the multiplexer into a differential output PCIe signal.

16. A system that comprises:
a processor having a PCIe root complex interface;
a peripheral having a PCIe end point interface; and
a retimer that couples the PCIe root complex interface to the PCIe end point interface, the retimer providing multiple lanes, each lane including:
a pair of upstream input contacts configured to receive an upstream input PCIe signal;
an upstream deserializer configured to convert the upstream input PCIe signal into an upstream digital symbol stream;
an upstream serializer configured to convert the upstream digital symbol stream into an upstream retimed PCIe signal;
an upstream multiplexer having a first selectable input configured to receive the upstream retimed PCIe signal;
an upstream bypass path configured to provide an upstream analog PCIe signal to a second selectable input of the upstream multiplexer; and
a pair of upstream output contacts coupled to an output of the upstream multiplexer to provide an upstream output PCIe signal.

17. The system of claim 16, further comprising:
a monitor configured to determine a PCIe signal integrity measurement for the upstream input PCIe signal; and control logic configured to control the upstream multiplexer based at least in part on the PCle signal integrity measurement.

18. The system of claim 17, wherein the PCle signal integrity measurement includes a signal to noise ratio.

19. The system of claim 17, wherein the PCle signal integrity measurement includes an eye height.

20. The system of claim 17, wherein each lane further includes:

a pair of downstream input contacts configured to receive a downstream input PCle signal;

a downstream deserializer configured to convert the downstream input PCle signal into a downstream digital symbol stream;

a downstream serializer configured to convert the downstream digital symbol stream into a downstream retimed PCle signal;

a downstream multiplexer having a first selectable input configured to receive the downstream retimed PCle signal;

a downstream bypass path configured to provide a downstream analog PCle signal to a second selectable input of the downstream multiplexer; and a pair of downstream output contacts coupled to an output of the downstream multiplexer to provide a downstream output PCle signal.

* * * * *